United States Patent
Williams et al.

(10) Patent No.: US 10,800,866 B2
(45) Date of Patent: Oct. 13, 2020

(54) SELF-HEALING RESIN

(71) Applicant: BEHR PROCESS CORPORATION, Santa Ana, CA (US)

(72) Inventors: Gregory Allen Williams, San Clemente, CA (US); Jens Hentschel, Westminster, CA (US); Anuradha Satpute, Pune (IN)

(73) Assignee: BEHR PROCESS CORPORATION, Santa Ana, CA (US)

( * ) Notice: Subject to any disclaimer, the term of this patent is extended or adjusted under 35 U.S.C. 154(b) by 453 days.

(21) Appl. No.: 15/407,579

(22) Filed: Jan. 17, 2017

(65) Prior Publication Data

US 2018/0201710 A1    Jul. 19, 2018

(51) Int. Cl.
  *C08F 220/14*      (2006.01)
  *C09D 133/12*      (2006.01)
  *C09D 133/10*      (2006.01)
  *C09D 133/02*      (2006.01)
  *C08F 220/18*      (2006.01)
  *C08F 220/06*      (2006.01)
  *C08F 220/28*      (2006.01)
  *C08F 220/56*      (2006.01)

(52) U.S. Cl.
  CPC .......... *C08F 220/14* (2013.01); *C09D 133/02* (2013.01); *C09D 133/10* (2013.01); *C09D 133/12* (2013.01); *C08F 220/06* (2013.01); *C08F 220/1804* (2020.02); *C08F 220/281* (2020.02); *C08F 220/56* (2013.01)

(58) Field of Classification Search
  CPC .. C09D 133/12; C09D 133/10; C09D 133/02; C08F 220/14; C08F 220/1804; C08F 220/06; C08F 220/56; C08F 220/281
  USPC ......................................................... 524/561
  See application file for complete search history.

(56) References Cited

U.S. PATENT DOCUMENTS

| | | | |
|---|---|---|---|
| 5,030,726 A * | 7/1991 | Noriyuki | C07D 229/00 427/388.2 |
| 5,045,616 A * | 9/1991 | Rauterkus | C04B 24/26 526/258 |
| 5,846,699 A | 12/1998 | Wang et al. | |
| 7,244,775 B2 | 7/2007 | Henda et al. | |
| 8,142,868 B2 | 3/2012 | O'Brien et al. | |
| 8,455,099 B2 | 6/2013 | Chevalier et al. | |
| 8,617,663 B2 | 12/2013 | O'Brien et al. | |
| 8,664,298 B1 | 3/2014 | Ou et al. | |
| 8,835,012 B2 | 9/2014 | O'Brien et al. | |
| 2006/0116476 A1 * | 6/2006 | Cheng | C08F 222/40 525/120 |
| 2009/0306311 A1 | 12/2009 | Reed | |
| 2012/0053260 A1 * | 3/2012 | Balk | C08F 2/24 522/84 |
| 2012/0114951 A1 | 5/2012 | Ichimura et al. | |
| 2013/0017405 A1 | 1/2013 | Benkoski et al. | |
| 2013/0096219 A1 | 4/2013 | Bowman et al. | |
| 2013/0196173 A1 | 8/2013 | Park et al. | |
| 2015/0175843 A1 | 6/2015 | Sonoda et al. | |
| 2015/0218323 A1 * | 8/2015 | Kim | H01L 51/5253 257/88 |

FOREIGN PATENT DOCUMENTS

WO    2012/065213 A1    5/2012

* cited by examiner

Primary Examiner — Angela C Scott
(74) Attorney, Agent, or Firm — Brooks Kushman P.C.

(57) ABSTRACT

A self-healing paint composition includes water, a self-healing polymer having a first functional group and a second functional group bonded thereto that interact with each other by dynamic covalent or dynamic non-covalent interactions, and one or more optional pigment compositions. At least one of the first functional group and the second functional group are present in an amount of 0.1 to 10 mole percent the emulsion self-healing polymer having a weight average molecular weight of about 15,000 g/mol to 1,000,000 g/mol.

27 Claims, No Drawings

_US 10,800,866 B2_

SELF-HEALING RESIN

TECHNICAL FIELD

In at least one embodiment, the present invention is related to paint compositions that include a self-healing resin.

BACKGROUND

Paint coatings are ubiquitous finding numerous applications for both aesthetic and functional applications. In many applications, paint coatings are applied to improve the aesthetic appeal of a surface by providing a uniform and pleasing appearance. In addition to aesthetics, paint coating can provide protection to the underlying substrate. However, when a painted substrate is damaged it must often be recoated with new material. If a coating could automatically repair inflicted damage it would dramatically increase its durability and lifetime.

Accordingly, there is a need for paint compositions the ability to self-repair and protect the underlying coated substrate.

SUMMARY

The present invention solves one or more problems of the prior art by providing in at least one embodiment, a self-healing resin. The self-healing resin includes a self-healing polymer having a first functional group and a second functional group bonded thereto that interact with each other by dynamic covalent or dynamic non-covalent interactions. Characteristically, the first functional group is present in an amount of 0.1 to 10 mole percent the self-healing polymer having a weight average molecular weight of about 15,000 g/mol to 1,000,000 g/mol. The weight average molecular weight of the self-healing polymer is such that the self-healing polymer dissolves in acetone with solubility greater than 0.1 g/ml at 25° C.

In another embodiment, a paint composition that includes the self-healing resin is provided. The paint composition includes water, a self-healing polymer having a first functional group and a second functional group bonded thereto that interact with each other by dynamic covalent or dynamic non-covalent interactions, and one or more optional pigment compositions. At least one of the first functional group and the second functional group are present in an amount of 0.1 to 10 mole percent the emulsion self-healing polymer having a weight average molecular weight of about 15,000 g/mol to 1,000,000 g/mol. The weight average molecular weight of the self-healing polymer is such that the self-healing polymer dissolves in acetone with solubility greater than 0.1 g/ml at 25° C.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

In one embodiment, a self-healing resin is provided. The self-healing resin avoids the need of recoating a substrate by providing a coating that automatically repairs damage. Advantageously, the self-healing resin uses dynamic covalent or dynamic non-covalent interactions are incorporated into a latex emulsion polymer through the use of specialty monomers. Examples of such interactions include, but are not limited to, hydrogen bonding, electrostatic, metal-ligand, reversible covalent bonds, and the like. These interactions can be triggered by an external stimulus (e.g., light, heat, redox, pH, etc.) or are completely automatic.

In a variation, the self-healing paint composition includes water, a self-healing polymer having a first functional group and a second functional group bonded to the self-healing polymer. The first and second functional groups interact with each other by dynamic covalent or dynamic non-covalent interactions, and one or more optional pigment compositions. The first functional group is present in an amount of 0.1 to 10 mole percent the self-healing polymer having a weight average molecular weight of about 15,000 g/mol to 1,000,000 g/mol, as measured as THF using gel permeation chromatography. In a refinement, the weight average molecular weight of the self-healing polymer is such that the self-healing polymer dissolves in acetone with solubility greater than 0.1 g/ml at 25° C. In this context, the mole percent is the number of moles of the first functional group in one mole of self-healing polymer divided by one mole of self-healing polymer times 100 percent. In a refinement, the first functional group is present in an amount in increasing order of preference of 0.05, 0.1, 0.2, 0.3, or 2 mole percent and in an amount less than, in increasing order of preference, 20, 15, 10, 8, 6, or 5 mole percent.

Typically, the weight average molecular weight of the self-healing polymer is less than 1,000,000. In a refinement, the weight average molecular weight of the self-healing polymer is less than increasing order of preference, 2,000,000; 1,000,000; 750,000; 500,000; or 300,000 and greater than in increasing order of preference, 50,000; 70,000; 100,000; 150,000; or 200,000. Not sure that this is a key point. The molecular weight should be low enough that the polymer can flow at elevated temperature. In one variation, the molecular weight of the self-healing polymer chains is lowered so that they are not physically cross-linked by chain entanglements. In a refinement, the self-healing polymer is formed in the presence of a chain transfer agent (CTA) to reduce the molecular weight of the self-healing polymer chains. For this variation, the molecular weight range is controlled by the level of CTA used, and a steady decrease in molecular weight is observed with increasing CTA percentage. Therefore, the self-healing polymer includes the residues of such chain transfer agents. Typically, the chain transfer agent is a $C_{1-15}$ thiol. Examples of the chain transfer agent include, but are not limited to, from the group consisting of octanethiol, butanethiol, thioglycolic acid, Z-thioethanol, methanethiol, ethanethiol, propanethiol, pentanethiol, hexanethiol, heptanethiol, nonanethiol, decanethiol, dodecanethiol, and combinations thereof.

As set forth above, the self-healing polymer is advantageously an emulsion polymer. Suitable emulsion polymers include, but are not limited to, monomers or functionalized monomers selected from acrylic polymers, vinyl acrylic copolymers, ethylene-vinyl acetate copolymers, styrene-acrylic copolymers, polyvinyl alcohol, and combinations thereof. Suitable film forming polymers are formed from one or more monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl, 1H,1H,3H-hexafluorobutyl methacrylate, 1H,1H,5H-octafluoropentyl methacrylate, ethylene, propylene, 1-butylene, 2 butylene, vinyl acetate, and combinations thereof. The monomers when functionalized can be functionalized with OH, halo, or combinations thereof.

Typically, the paint composition includes the emulsion polymer in an amount from about 25 to 60 weight percent of the total weight of the paint composition and the optional pigments in an amount from about 5 to 40 weight percent of the total weight of the paint composition with the balance being water. In another embodiment, the paint composition includes the self-healing polymer in an amount from about 40 to 50 weight percent of the total weight of the paint composition, the optional pigments in an amount from about 10 to 30 weight percent of the total weight with the balance being water.

As set forth above, the paint composition optionally includes one or more pigments. Suitable pigments are azo dyes, phthalocyanine, anthraquinone dyes, titanium oxide, calcium carbonate, iron oxides (black, yellow and red), zinc oxide and carbon black, powdered metals, metal compounds (e.g., zinc phosphate), and combinations thereof. In a variation, the paint composition can include a matting agent to adjust the gloss to a lower sheen. The matting agent can be any extender pigment that does not add opacity to the clear coat, such as silicas, nepheline syenite, and the like. In a refinement, the matting agent is present in an amount from about 0.2 to 10 percent of the dry weight of the paint composition. In a variation, some paint compositions may not contain pigment, such as, for example, a self-healing high gloss clear coating.

In some variations, the paint composition further includes one or more additives selected from the group consisting of rheology modifiers, surfactants, defoamers, organic solvents, pH adjusters, UV stabilizers, dispersants, coalescents, biocides, inorganic pigment, organic pigments, and combinations thereof. Typically, the additives are present in an amount from about 0.1 to 20 weight percent of the total weight of the paint composition. Examples of surfactants commonly used in emulsion polymerization include, but are not limited to fatty acids, sodium lauryl sulfate, and alpha olefin sulfonate.

The following examples illustrate the various embodiments of the present invention. Those skilled in the art will recognize many variations that are within the spirit of the present invention and scope of the claims.

Dynamic Non-Covalent Self-Healing

In order to prepare dynamic non-covalent self-healing resins, the molecular weight of the emulsion polymer was reduced using a chain transfer agent. This decrease in molecular weight allowed for increased chain mobility at elevated temperature, resulting in self-healing behavior. In order to increase hardness and physical properties lost by reduced molecular weight, dynamic non-covalent cross-links were introduced throughout the film by utilizing methacrylamide copolymerized into the polymer. The methacrylamide functionality provided the necessary hydrogen bonding to increase hardness and improve physical properties while still being dynamic at elevated temperature.

Dynamic Covalent Self-Healing

Similar to the case of the dynamic non-covalent resin, the molecular weight was lowered using a chain transfer agent. Then a cross-linkable functionality, furfuryl methacrylate (FM) was copolymerized into the resin. This functionality could be cross-linked with a bismaleimide to form the Diels-Alder adduct. The Diels-Alder adduct is reversible at elevated temperature but stable at room temperature and is more solvent resistant than hydrogen bonds, due to the covalent bonds. The bismaleimide used in this case was 1,1'-(methylenedi-4,1-phenylene)bismaleimide due to its availability from commercial sources. Unfortunately, this molecule was not water soluble and could not be added directly to the resin. The intent is that the bismaleimide is water soluble, can be added to the resin and will not react until evaporation of the water and coalescence of the emulsion polymers is complete. In this case, the bismaleimide would crash out of the water phase when added to the self-healing emulsion. To overcome this and prove the concept, the self-healing emulsion with lowered molecular weight and containing furfuryl methacrylate was first dried to form a film. The resulting solid was then dissolved in THF or DMF (a solvent that 1,1'-(Methylenedi-4,1-phenylene) bismaleimide is soluble in). Then the bismaleimide pre-dissolved in THF or DMF was added to the dissolved self-healing polymer and the mixture was cast. Upon drying the covalent cross-links formed through the Diels-Alder reaction. Upon scratching and heating at elevated temperatures the scratches would heal.

Control Resin Synthesis

The control resin was synthesized in accordance to the recipe set forth in Table 1.

TABLE 1

Control composition
Control

| Name | | Loading (g) |
|---|---|---|
| Monomer Composition | | |
| Monomer 1 | Butyl acrylate, (BA) | 223.0 |
| Monomer 2 | Methyl methacrylate, (MMA) | 262.9 |
| Monomer 3 | Methacrylic acid, (MAA) | 5.0 |
| Monomer 4 | Methacrylamide, (MA) | — |
| Monomer 5 | Furfuryl Methacrylate, (FM) | — |
| Total Monomer | | 490.9 |
| Other Ingredients | | |
| Emulsifier | Rhodacal DS-10 (Solvay Inc.) | 5.9 |
| Initiator | Sodium persulfate (SPS) | 1.2 |
| Base/Buffer | Sodium carbonate | 2.0 |
| Defoamer | BYK-022 | 0.1 |
| Water | DI water | 496. |
| Chaser (reducer) | Bruggolit FF6M | 1.9 |

TABLE 1-continued

Control composition
Control

| Name | | Loading (g) |
|---|---|---|
| Chaser (oxidizer) | Tert-butyl hydroperoxide solution | 2.0 |
| Chain transfer agent (CTA) | 1-dodecanethiol (DDT) | — |
| Total weight (g) | | 1000.0 |

Self-Healing Resin Preparation Procedure 1

Step I: Pre-Emulsion Preparation

The pre-emulsion was made in a conical flask with 1000 mL capacity. 250 mL water was added to 1 g of sodium carbonate followed by 4 g of DS-10 surfactant and stirred at 150 rpm using an overhead stirrer. While stirring at 150 rpm, 223.0 g n-butyl acrylate and 262.9 g of methyl methacrylate were added. The speed was then increased to 600 rpm and then 5.0 g of methacrylic acid was added. The mixture was then stirred at 850 rpm for 30 min.

Step II: Reactor Set Up

In a 2.5 L reactor was added 176 mL water, 1.0 g of sodium carbonate, and 1.9 g of DS-10. The reactor is then set to a temperature of 82-86° C. stirred at 150 rpm.

Step III: Initiator and Chaser Preparation

The initiator solution was prepared by adding 1.2 g of sodium persulfate to 50 mL water. The chaser was prepared by adding 1.9 g of Bruggolit FF6M to 10 mL water and 2.0 g of tert-butyl hydroperoxide (70% solution in water) to 10 mL of water.

Step IV: Addition of Reactants and Conditions

The seeding step was performed by adding 4% pre-emulsion and 4% initiator to the reactor. The mixture was stirred at 86° C. for 30 min. The solution showed a purple/blue tint, confirming initiation of the reaction.

The remaining 96% of the pre-emulsion was added over 3 hours using peristaltic pump and the initiator added over 3 hours 15 minutes via syringe pump. The addition was performed at 175 RPM and 82-86° C. After complete addition the mixture was stirred an additional 30 minutes at 82-86° C. The reactor temperature was lowered to 55-60° C. and then the chaser was added over 10 min and mixture kept at 50-60° C. for 30 minutes. The heat was removed and then 0.1 g of BYK-022 defoamer was added. The resin was filtered via 150-200 micron mesh and the following QC properties were measured: VOC, pH, particle size and % Solid.

Self-Healing Resin Preparation Procedure 2

Step-I, II & III: Common for all the Procedures

Pre-emulsion, initiator and reactor charge will get prepared by a similar method as set forth above.

Step-IV—Polymerization

In this step, 5% pre-emulsion and 40% initiator are added dropwise into the reactor by addition funnel when the temperature of the reactor reach to 84-86° C. About 1 drop of the pre-emulsion and initiator are added simultaneously in the reactor. Once the pre-emulsion (PE) is finished continue addition of initiator till it get finished. The reaction is allowed to continue for next 20 min after complete addition of initiator. Any remaining PE and initiator are added to the reactor with about 1 drop of initiator being added in the reactor after 30 drops of pre-emulsion. 1-2 drop of pre-emulsion will take 2 seconds to get added in the reactor with addition funnel hence 1 drop of initiator will get added in the reactor in nearly 45 Sec to 1 minute. The addition of pre-emulsion will take about 3 hours while the initiator will take about 3 to 3 hr:15 min. Once completed, the initiator is added in the reactor while allowing the reaction to continue at 84-86° C. for another 30 min. The reactor is prepared for addition of the chaser by lowering the kettle temperature to 55-60° C.

Step-V—Chaser Addition

Prepare the solutions as set forth above. The reducing and oxidizing agent are added simultaneously in the reactor with an addition funnel in such a way that the addition is completed within 10 min.

The reaction is allowed to continue at 55-60° C. for 30 min. The heating is then stopped with stirring continuing until the kettle reaches room temperature. Defoamer BYK022 is added in an amount of 0.1 gm for 1000 mL reaction with stirring continuing for 10 min. The resin is filtered with 150-200 micron filter. Quality control procedures are used to determine the about solids, pH, particle size and specific weight.

Self-Healing Resin Preparation Procedure 3

A Self-healing latex emulsion polymer is also prepared by changing the manner in which polyethylene (PE) and initiator are added to the reactor. In this variation, nitrogen is used to degas the deionized water. A kettle charge is prepared by combining 1.59 g DS-10, 1 g sodium carbonate, and 176 g deionized water and then mixing at 150 RPM to mix and dissolve all ingredients. Nitrogen gas is used to purge the reaction kettle and keep the kettle free of oxygen. A monomer pre-emulsion is prepared by premixing 250 g deionized water, 4 g DS-10, and 1 g sodium carbonate, mix it at 150-200 RPM. The monomer butyl acrylate is added and the stirring speed increased to 600 RPM. The monomer methyl methacrylate is then added and the stirring speed increased to 850-900 RPM. Next, the monomer methacrylic acid is added. Dodecanethiol is added in 2 fractions during the reaction after pre-seeding. Preparation of the pre-emulsion is completed by mixing at 850-900 RPM for 20-30 minutes. An initiator solution is prepared by dissolving 1.5 g sodium persulfate in 50 g DI water. A chaser solution is prepared by dissolving 1.89 g Bruggolit FF6M in 10 g water and by diluting 2.0 g tert-butyl hydroperoxide solution in 10 g water.

Polymerization is then accomplished by pre-seeding in which the kettle is heated to 82-86° C. with stirring at 175-178 RPM. About 20.6 g (40% total amount) sodium persulfate solution (SPS) and 75 g (about 10% total amount) monomer pre-emulsion are added to kettle under mixing at 150-175 RPM by addition funnel. The rate of initiator addition should be double that of the pre-emulsion and the rest of the initiator is added in the reactor continuously. The complete addition will take about 45 min. The kettle temperature is maintained within the 82-86° C. range with the pre-seeding being held for 20 minutes. Continuous polymerization is accomplished by keeping the temperature at 82-84° C. while feeding the monomer pre-emulsion (as percentage of the total amount: 10%+50%+20%+20%) and sodium persulfate initiator solution simultaneously but independently. Both solutions are fed at a constant rate over 3 hours. The chain transfer agent is added in two fractions. First, 50% chain transfer agent is added after 60% of pre-emulsion addition (10% of pre-seeding+50%) by continuous drop method with addition funnel. The remainder of the chain transfer agent is added after 80% pre-emulsion addition (10%+50%+20%) of the total percentage of the chain transfer agent), keep the reaction for 30 min. after completing PE and SPS feeding. At this point, the mixing speed can be raised up to 250 RPM with the latex viscosity rising and the mixer position should be adjusted with pre-emulsion feeding. After cooling down the batch to 55-60° C., the Bruggolit FF6M and the tert-butyl hydroperoxide chaser solutions are added separately and simultaneously over 10 min. After adding all the FF6M and tert-butyl hydroperoxide solutions to the kettle, the reaction continued for 30 min. Heating is then stopped to allow the reactor to attain room temperature. About 0.1 g BYK-022 is added to the batch (if required) and mixed for 15 min. The latex level in the kettle will decrease with de-foaming during this time. A 200 micron filter is used to filter the latex when transferring the latex from the reactor to a storage container or tank. The latex in solids, the pH, the particle size and specific weight are verified.

Example of Low Molecular Weight Self-Healing Resin Synthesis

The control procedure was followed, except that 24.5 g of n-dodecanethiol was added to the pre emulsion.

Example of Low Molecular Weight Non-Covalent (Hydrogen Bonding) Self-Healing Resin Synthesis The control procedure was followed, except that 24.5 g of n-dodecanethiol and 4.9 g of methacrylamide were added to the pre emulsion.

Example of Low Molecular Weight Dynamic Covalent (Diels-Alder) Self-Healing Resin Synthesis The control procedure was followed, except that 24.5 g of n-dodecanethiol and 12.25 g of furfuryl methacrylate were added to the pre emulsion.

Evaluation of Self-Healing Performance of Resin

To evaluate self-healing performance, a film (6-7 mil dry film thickness, 12 mil wet) was applied on a metal panel and dried for 24 hrs. to 3 days. The film was then scratched without damaging the underlying metal substrate and heated using a hair dryer, hot plate, or oven set at 60° C. The scratches disappearance time was recorded. Table 2 provides a summary of the non-covalent self-healing resins tested. Table 3 provides a summary of self-healing properties for these resins. Table 4 provides a summary of the hardness results while Table 5 provides a summary of the self-healing properties of these resins. Self-healing was determined on a LENETA Chart after annealing at 60° C. within 30 min in the oven.

TABLE 2

Summary of resin compositions.

|  | Name | Control Loading (g) | Low MW Loading (g) | Low MW H-Bonding Loading (g) | Low MW Dynamic Loading (g) |
|---|---|---|---|---|---|
| Monomer Composition |  |  |  |  |  |
| Monomer 1 | Butyl acrylate, (BA) | 223.0 | 223.0 | 223.0 | 223.0 |
| Monomer 2 | Methyl methacrylate, (MMA) | 262.9 | 262.9 | 262.9 | 262.9 |
| Monomer 3 | Methacrylic acid, (MAA) | 5.0 | 5.0 | 5.0 | 5.0 |
| Monomer 4 | Methacrylamide, (MA) | — | — | 4.9 | — |
| Monomer 5 | Furfuryl Methacrylate, (FM) | — | — | — | 12.2 |
| Total Monomer |  | 490.9 | 490.9 | 495.8 | 503.1 |
| Other Ingredients |  |  |  |  |  |
| Emulsifier | Rhodacal DS-10 (Solvay Inc.) | 5.9 | 5.9 | 5.9 | 5.9 |
| Initiator | Sodium persulfate (SPS) | 1.2 | 1.2 | 1.2 | 1.2 |
| Base/Buffer | Sodium carbonate | 2.0 | 2.0 | 2.0 | 2.0 |
| Defoamer | BYK-022 | 0.1 | 0.1 | 0.1 | 0.1 |
| Water | DI water | 496.2 | 496.2 | 496.2 | 496.2 |
| Chaser (reducer) | Bruggolit FF6M | 1.8 | 1.8 | 1.8 | 1.8 |
| Chaser (oxidizer) | Tert-butyl hydroperoxide solution | 2.0 | 2.0 | 2.0 | 2.0 |
| Chain transfer agent | 1-dodecanethiol | — | 24.5 | 24.5 | 24.5 |
| Total weight (g) |  | 1000.0 | 1024.5 | 1029.4 | 1036.7 |

TABLE 3

Hardness measurements for non-covalent self-healing resins

| Example No. | Bulk Monomers | Ratio | CTA Type | CTA Level | Specialty Monomer | Specialty Monomer Level | Wt % Solids | Vol. % Solids | Particle Size (nm) | pH | Tg (° C.) | Pendulum Hardness 7 Days |
|---|---|---|---|---|---|---|---|---|---|---|---|---|
| 1 | BA/MMA | 46/54 | — | — | — | — | 48.3 | 46.1 | 142 | 6.8 | 23.9 | 14 |
| 2 | BA/MMA | 46/54 | DDT | 5% | — | — | 49.7 | 46.4 | 144 | 6.2 | 5.2 | 1 |
| 3 | BA/MMA | 46/54 | Butanethiol | 5% | — | — | 43.6 | 40.8 | 194 | 6.7 | −17.0 | 0 |
| 4 | BA/MMA | 46/54 | DDT | 3% | None | NA | 54.8 | 46.4 | 153 | 6.8 | 7.5 | 2 |
| 5 | BA/MMA | 46/54 | DDT | 5% | Methacrylamide | 1% | 51.3 | 48.0 | 187 | 7.1 | 11.0 | 5 |
| 6 | BA/MMA | 46/54 | DDT | 3% | Methacrylamide | 1% | 50.5 | 47.7 | 119 | 6.9 | 7.4 | 6 |
| 7 | BA/MMA | 46/54 | DDT | 3% | Methacrylamide | 1.5% | 50.3 | 44.9 | 154 | 6.9 | — | 6 |
| 8 | BA/MMA | 40/60 | DDT | 3% | Methacrylamide | 1% | 51.8 | 47.7 | 116 | 6.4 | 20.2 | 21 |
| 9 | EHA/Sty | 40/60 | DDT | 3% | Methacrylamide | 1% | 53.2 | 49.3 | 159 | 6.8 | 12.1 | 2 |
| 10 | EHA/Sty | 30/70 | DDT | 3% | Methacrylamide | 1% | 51.7 | 50.3 | 165 | 6.7 | 29.6 | 30 |
| 11 | BA/MMA | 46/54 | — | — | Methacrylamide | 1% | 49.5 | 45.8 | 136 | 6.6 | 22. | 14 |

TABLE 4

Healing results for non-covalent self-healing resins

| Example No. | Bulk Monomers | Ratio | CTA Type | CTA Level | Specialty Monomer | Specialty Monomer Level | Heals? | Healing Conditions | | | |
|---|---|---|---|---|---|---|---|---|---|---|---|
| 1 | BA/MMA | 46/54 | — | — | — | — | No | | | | |
| 2 | BA/MMA | 46/54 | DDT | 5% | — | — | Yes | — | 55 C., 3 h | 60 C., 5-10 min | 70 C., 3-5 min | 80 C., 1 min |
| 3 | BA/MMA | 46/54 | Butanethiol | 5% | — | — | Yes | — | — | 60 C., 3-5 min | 70 C., 2 min | 80 C., 1 min |
| 4 | BA/MMA | 46/54 | DDT | 3% | None | NA | Yes | — | 55 C., 3 h | 60 C., 5-10 min | 70 C., 1 min | 80 C., 30 sec |
| 5 | BA/MMA | 46/54 | DDT | 5% | Methacrylamide | 1% | Yes | — | — | 60 C., 1 h | 70 C., 30 min | 80 C., 5 min |
| 6 | BA/MMA | 46/54 | DDT | 3% | Methacrylamide | 1% | Yes | 45 C., 40 h | 55 C., 1 h | 60 C., 5 min | 70 C., 3-5 min | 80 C., 1 min |
| 7 | BA/MMA | 46/54 | DDT | 3% | Methacrylamide | 1.5% | Yes | — | — | — | — | 80 C., 1 min |

TABLE 4-continued

Healing results for non-covalent self-healing resins

| Example No. | Bulk Monomers | Ratio | CTA Type | CTA Level | Specialty Monomer | Specialty Monomer Level | Heals? | Healing Conditions | | | | |
|---|---|---|---|---|---|---|---|---|---|---|---|---|
| 8 | BA/MMA | 40/60 | DDT | 3% | Methacrylamide | 1% | Yes | 45 C., 52 h | 55 C., 6 h | 60 C., 5-10 min | 70 C., 5 min | 80 C., 1 min |
| 9 | EHA/Sty | 40/60 | DDT | 3% | Methacrylamide | 1% | Yes | — | — | 60 C., 5 min | 70 C., 3-5 min | 80 C., 30 sec |
| 10 | EHA/Sty | 30/70 | DDT | 3% | Methacrylamide | 1% | Yes | — | — | 60 C., 5-10 min | 70 C., 5 min | 80 C., 1 min |
| 11 | BA/MMA | 46/54 | — | — | Methacrylamide | 1% | No | — | — | — | — | — |

The results of the properties of resin compositions employing dynamic covalent bonding were also evaluated. The compositions set forth in Table 5 were evaluated using a bismaleimide cross-linker (1,1'-(Methylenedi-4,1-phenylene)bismaleimide). Due to the insolubility of the bismaleimide, the resins were first dried to remove the water. They were then redissolved in either THF or DMF and an appropriate level of cross-linker was added with mixing. The samples were then cast from the solvent to yield dry films. The dry films were investigated for their self-hardness and healing properties as summarized in Tables 6 and 7, respectively.

Paint Formulas Containing Self-Healing Non-Covalent Resins

The resins were evaluated in Behr Premium Plus High Gloss 8300. The existing resin was replaced with self-healing resin Example 6 and Example 8. No coalescent was necessary in the batches containing self-healing resin for complete film formation at 40° F. The standard method is used to produce the paint formulations except the substitution of the resin with the respective self-healing resins. Film of DFT 5-8 mil is used for confirming self healing performance. Film with Example 6 heals within 45-60 min at 60-65° C. and if heals by hair dryer takes 30 min whereas

TABLE 5

Dynamic covalent bonding compositions.

| Example No. | Bulk Monomers | Ratio | CTA Type | CTA Level | Specialty Monomer | Specialty Monomer Level | Comment |
|---|---|---|---|---|---|---|---|
| 12 | BA/MMA | 46/54 | — | — | FM | 2.5% | |
| 13 | BA/MMA | 46/54 | DDT | 3% | FM | 2.5% | FM added in last 30% PE |
| 14 | BA/MMA | 46/54 | DDT | 3% | FM | 2.5% | FM added in last 10% PE |

TABLE 6

Hardness in resins before adding the bismaleimide cross-linker.

| Example No. | Bulk Monomers | Ratio | CTA Type | CTA Level | Specialty Monomer | Specialty Monomer Level | Wt % Solids | Vol. % Solids | Particle Size (nm) | pH | Tg (° C.) | Pendulum Hardness 7 Days |
|---|---|---|---|---|---|---|---|---|---|---|---|---|
| 12 | BA/MMA | 46/54 | — | — | FM | 2.5% | 49.5 | 45.4 | 124 | 6.6 | 21.5 | 14 |
| 13 | BA/MMA | 46/54 | DDT | 3% | FM | 2.5% | 49.6 | 45.9 | 161 | 6.8 | 7.2 | 6 |
| 14 | BA/MMA | 46/54 | DDT | 3% | FM | 2.5% | 47.9 | 44.7 | 180 | 6.8 | 7.2 | 7 |

TABLE 7

Self-healing in resins using dynamic covalent bonding.

| Example No. | Resin Sample No. | Cross-linker Type | Solvent for BM | Cross-linker Level | Tg | Heals? | Healing Conditions | Hardness 7 day | Hardness 1 month |
|---|---|---|---|---|---|---|---|---|---|
| 15 | 12 | Bismaleimide | DMF | 5% | 21.5 | No | — | 15 | 17 |
| 16 | 13 | Bismaleimide | DMF | 1.25% | 2.34 | Yes | 60 C., 10 min | 5 | 7 |
| 17 | 14 | Bismaleimide | DMF | 1.25% | 4.25 | Yes | 60 C., 10 min | 5 | 7 |
| 18 | 14 | Bismaleimide | DMF | 2.32% | 4.25 | Yes | 60 C., 10 min | 7 | 14 |
| 19 | 14 | Bismaleimide | THF | 2.32% | — | Yes | 60 C., 10 min | 4 | 7 |

Example 8 takes 60 min at 60-65° C. and with hair dryer it takes 10 min for healing. CTR has no healing performance even if exposed to higher temperature of 120-150° C.

The resins were evaluated in Behr Wet-Look Sealer 985. The existing resin was replaced with self-healing resin Example 6 and Example 8, as batch 3 and 4, respectively. No coalescent was necessary in the batches containing self-healing resin. The standard method is used to produce the paint formulations except the substitution of the resin with the respective self-healing resins. Batch 3 & 4 along with CTR applied on metal of 5-8 mil DFT and on Quarry tile by brush and tried to maintained uniform film formation. Films dried for 3 days at room temperature before checking self healing performance. Film cut 'X' with sharp cutter and deep scratch made on panel. On metal as well as on quarry tile with hair dryer, batch 3 takes 10 min whereas batch 4 takes 5 min for healing, Quary tile kept in oven for healing at 60-65° C., healing observed within 20-25 min whereas the metal panel kept over heating plate under controlled temperature of 60-65° C. and healing observed within 30 min. CTR does not have any healing performance even if exposed to high temperature 120-150° C.

The resins were also evaluated in Behr Premium Waterproofing Wood Finish 500. The existing resin was replaced with self-healing resin Example 6 and Example 8, as batch 5 and 6, respectively. No coalescent was necessary in the batches containing self-healing resin. The standard method is used to produce the paint formulations except the substitution of the resin with the respective self-healing resins. Self-healing was observed in these samples. The coating prepared with thickness of 5-8 mil DFT on wood, dried for 3 days before test. Performed self healing by using hair dryer, batch 5 & 6 takes 10-15 min for healing on wood and at 60-65° C. takes 30 min whereas CTR does not heal even when exposed at 60-65° C. for 48 hrs In order to evaluate the self-healing property of the resin, a sample was applied to a metal panel with square bar (BYK) of 15-20 mil WFT so to yield a final dry film of 5-8 mil. Film can also be formed by using foam brush or nylon brush to achieve 5-8 mil dry film. The film was then dried for various times (24 h, 3 day, 7 day) and then scratched with an "X" using a sharp knife. The scratch was deep enough to only penetrate the film and not the substrate. The healing was then monitored using a pre-set temperature on a heating plate or in an oven such as 45, 55, 60, 70, 85° C. while monitoring the self-healing at different temperature and time. Healing can also be done by using a standard hair dryer which operates at approximately 70 to 80° C. Self-healing was also observed when panels were placed outside in sunlight. The sunlight caused the temperature to rise sufficiently for self-healing to occur. The panels were prepared similar as mentioned above. Testing was done on metal, wood and concrete by keeping the substrate in a horizontal position. The substrate temperature and healing time was monitored. Healing typically occurred within 2-4 hrs. Considering the temperature of the substrate at 53-60° C.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments, variations, and refinements may be combined to form further embodiments of the invention.

What is claimed is:

1. A self-healing resin comprising:
a self-healing polymer having a first functional group and a second functional group bonded thereto, the first functional group and the second functional group interacting with each other by dynamic covalent or dynamic non-covalent interactions, at least one of the first functional group and the second functional group being present in an amount of 0.1 to 10 mole percent, and the self-healing polymer having a weight average molecular weight greater than 200,000 g/mol and less than 1,000,000 g/mol wherein the self-healing polymer is a copolymer of furfuryl methacrylate.

2. The self-healing resin of claim 1, wherein the weight average molecular weight of the self-healing polymer is such that the self-healing polymer dissolves in acetone with solubility greater than 0.1 g/ml at 25° C.

3. The self-healing resin of claim 1 wherein the self-healing polymer is an emulsion self-healing polymer.

4. The self-healing resin of claim 1 wherein self-healing polymer segments interact by hydrogen bonding, electrostatic, metal-ligand interactions, reversible covalent bonds, or combinations thereof.

5. The self-healing resin of claim 1 wherein dynamic covalent or dynamic non-covalent interactions are triggered by an external stimulus.

6. The self-healing resin of claim 5 wherein dynamic covalent or dynamic non-covalent interactions are triggered by light, heat, redox, or a change in pH.

7. The self-healing resin of claim 1 further including a residue of a chain transfer agent that reduces the weight average molecular weight of self-healing polymer chains in the self-healing polymer.

8. The self-healing resin of claim 7 wherein the chain transfer agent is a $C_{1-15}$ thiol.

9. The self-healing resin of claim 8 wherein the chain transfer agent is selected from the group consisting of octanethiol, butanethiol, thioglycolic acid, Z-thioethanol, methanethiol, ethanethiol, propanethiol, pentanethiol, hexanethiol, heptanethiol, nonanethiol, decanethiol, dodecanethiol, and combinations thereof.

10. The self-healing resin of claim 1 wherein the furfuryl methacrylate is copolymerized with a monomer or a functionalized derivative of a monomer selected from the group consisting of acrylic acid, methacrylic acid, methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, methacrylate, pentafluorophenyl methacrylate bis-(2,2,2-trifluoroethyl) itaconate, bis-(1,1,1,3,3,3-hexafluoroisopropyl) acrylate, 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, bis-(2,2,2-trifluoroethyl) itaconate, bis-(1,1,1,3,3,3-hexafluoroisopropyl) acrylate, 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, pentafluorophenyl acrylate, 1,1,1,3,3,3-hexafluoroisopropyl acrylate, 1H,1H,2H,2H-Heptadecafluorodecyl methacrylate acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl methacrylate, 1H,1H,3H-hexafluorobutyl methacrylate, 1H,1H,5H-octafluoropentyl, ethylene, propylene, 1-butylene, 2 butylene, vinyl acetate, and combinations thereof, such that from 0.1 to 5 weight percent of the monomers have functional groups covalently bonded to the self-healing polymer that interact with each other by dynamic covalent or dynamic non-covalent interactions, the functional groups being OH, halogen, or combinations thereof.

11. The self-healing resin of claim 1 wherein the self-healing polymer is formed by one or more monomers or functionalized derivative of monomers selected from the group consisting of acrylic acid, methacrylic acid, methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, and combinations thereof, such that from 0.1 to 5 weight percent of the monomers have functional groups covalently bonded to the self-healing polymer that interact with each other by dynamic covalent or dynamic non-covalent interactions, the functional groups being OH, halogen, or combinations thereof.

12. The self-healing resin of claim 1 wherein the self-healing resin is cross-linked with a bismaleimide.

13. The self-healing resin of claim 12 wherein the bismaleimide is 1,1'-(methylenedi-4,1-phenylene)bismaleimide.

14. A paint composition comprising:
water;
a self-healing polymer having a first functional group and a second functional group bonded thereto, the first functional group and the second functional group interacting with each other by dynamic covalent or dynamic non-covalent interactions, at least one of the first functional group and the second functional group being present in an amount of 0.1 to 10 mole percent, and the self-healing polymer having a weight average molecular weight of greater than 200,000 g/mol and less than 1,000,000 g/mol wherein the self-healing polymer is a copolymer of furfuryl methacrylate; and
one or more optional pigment compositions.

15. The paint composition of claim 14 wherein the weight average molecular weight of the self-healing polymer is such that the self-healing polymer dissolves in acetone with a solubility greater than 0.1 g/ml at 25° C.

16. The paint composition of claim 14 wherein the self-healing polymer is an emulsion self-healing polymer.

17. The paint composition of claim 14 wherein self-healing polymer segments interact by hydrogen bonding, electrostatic, metal-ligand interactions, reversible covalent bonds, or combinations thereof.

18. The paint composition of claim 14 wherein dynamic covalent or dynamic non-covalent interactions are triggered by an external stimulus.

19. The paint composition of claim 18 wherein the dynamic covalent or dynamic non-covalent interactions are triggered by light, heat, redox, or a change in pH.

20. The paint composition of claim 14 further including a residue of a chain transfer agent that reduces the weight average molecular weight of self-healing polymer chains in the self-healing polymer.

21. The paint composition of claim 20 wherein the chain transfer agent is a $C_{1-15}$ thiol.

22. The paint composition of claim 21 wherein the chain transfer agent is selected from the group consisting of octanethiol, butanethiol, thioglycolic acid, Z-thioethanol, methanethiol, ethanethiol, propanethiol, pentanethiol, hexanethiol, heptanethiol, nonanethiol, decanethiol, dodecanethiol, and combinations thereof.

23. The paint composition of claim 14 wherein the furfuryl methacrylate is copolymerized with a monomer or a functionalized derivative of a monomer selected from the group consisting of acrylic acid, methacrylic acid, methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, methacrylate, pentafluorophenyl methacrylate bis-(2,2,2-trifluoroethyl) itaconate, bis-(1,1,1,3,3,3-hexafluoroisopropyl) acrylate, 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, bis-(2,2,2-trifluoroethyl) itaconate, bis-(1,1,1,3,3,3-hexafluoroisopropyl) acrylate, 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, pentafluorophenyl acrylate, 1,1,1,3,3,3-hexafluoroisopropyl acrylate, 1H,1H,2H,2H-Heptadecafluorodecyl methacrylate acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl methacrylate, 1H,1H,3H-hexafluorobutyl methacrylate, 1H,1H,5H-octafluoropentyl, ethylene, propylene, 1-butylene, 2 butylene, vinyl acetate, and combinations thereof, such that from 0.1 to 5 weight percent of the monomers have functional groups covalently bonded to the self-healing polymer that interact with each other by dynamic covalent or dynamic non-covalent interactions.

24. The paint composition of claim 23 wherein the functional groups are OH, halogen, or combinations thereof.

25. The paint composition of claim 14 wherein the self-healing polymer is formed by one or more monomers or functionalized derivative of monomers selected from the group consisting of acrylic acid, methacrylic acid, methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, and combinations thereof, such that from 0.1 to 5 weight percent of the monomers have functional groups covalently bonded to the self-healing polymer that interact with each other by dynamic covalent or dynamic non-covalent interactions, the functional groups being OH, halogen, or combinations thereof.

26. The paint composition of claim 14 wherein the self-healing polymer is cross-linked with a bismaleimide.

27. The paint composition of claim 26 wherein the bismaleimide is 1,1'-(methylenedi-4,1-phenylene)bismaleimide.

* * * * *